United States Patent [19]

Hinz et al.

[11] 4,367,953
[45] Jan. 11, 1983

[54] APPARATUS FOR THE CONTINUOUS PREPARATION OF STARCH MILK

[75] Inventors: Gerhard Hinz, Kranenburg-Nutterden; Joseph Dinessen, 4193 Kranenburg-Frasselt, both of Fed. Rep. of Germany

[73] Assignee: CPC International Inc., Englewood Cliffs, N.J.

[21] Appl. No.: 204,407

[22] Filed: Nov. 6, 1980

[30] Foreign Application Priority Data

Nov. 9, 1979 [DE] Fed. Rep. of Germany ....... 2945361

[51] Int. Cl.³ ............................................. B01F 15/02
[52] U.S. Cl. ..................................... 366/132; 366/138; 366/156; 366/171; 366/194; 366/305; 366/307
[58] Field of Search ...................... 366/10, 16, 20, 33, 366/35, 40, 51, 76, 77, 98, 101, 171, 138, 132, 150–156, 160–162, 165, 176, 177–182, 190, 191, 194–196, 241, 279, 341–343, 305–307; 222/630, 129.1–129.4, 146 R, 146 HE; 99/452

[56] References Cited

U.S. PATENT DOCUMENTS 3,403,712 10/1968 Westling .............................. 222/630
3,425,667 2/1969 Schutte et al. ...................... 366/132
3,995,838 12/1976 Zucker ................................. 366/160

Primary Examiner—Philip R. Coe
Assistant Examiner—Timothy F. Simone

[57] ABSTRACT

An apparatus for continuously preparing starch milk is disclosed. The apparatus comprises a dosing means for supplying starch to a homogenizing tank. The homogenizing tank has an upper in-flow hopper provided with a flushing means, an agitating means, and a lower section. The dosing means has an outlet that opens into the upper in-flow hopper. A fall pipe is disposed between the outlet of the upper in-flow hopper and the lower section. The apparatus requires less energy than prior art apparatus and is not prone to operational disruptions as a result of variations in the starch milk concentration.

21 Claims, 12 Drawing Figures

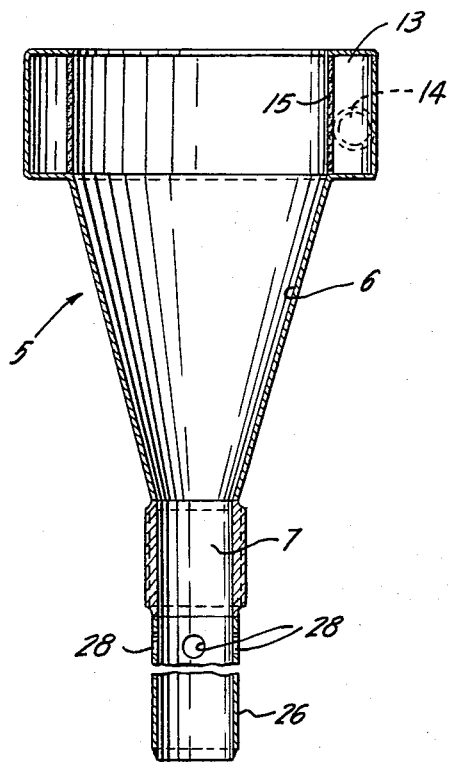
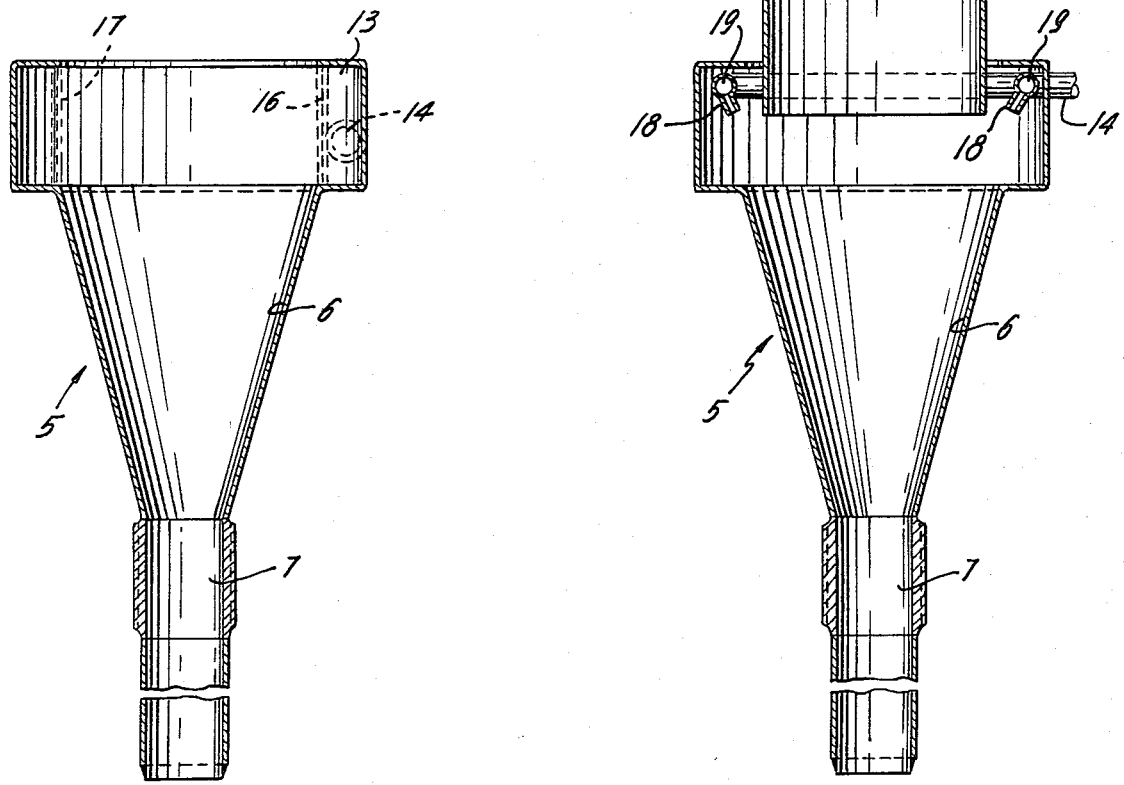

APPARATUS FOR THE CONTINUOUS PREPARATION OF STARCH MILK

BACKGROUND OF THE INVENTION

1. Field of the Invention

The invention relates to apparatus for the continuous preparation of starch milk with a dosing device for supplying the starch and a homogenising tank provided with an agitation mechanism.

The term, "starch milk" as used in this specification means a starch-water mixture of solution, which is also referred to as a slurry.

2. The Prior Art

On pages 351 and 352 of the journal "Die Starke", No. 11, Vol. 16, a method of preparing a homogeneous starch milk is described. In this instance the suspension was added in charges, and continuous operation was made possibly by two flotation tanks. The tanks were equipped with a high-speed propeller agitator. Screws with controlled rotary speed were used for dosing air-dry starch. On the cited pages it is stated that continuous preparation of starch milk was only of interest for larger capacities, and the problem of continuous preparation of starch milk was not therefore pursued further. Moreover, the starch in this known apparatus was introduced in doses without any special controls, as it was possible to maintain the liquid state by means of float valves. However, the surface is moved by the agitation mechanism, so that only a mean value can be sought for dosing the water. Although this system is adequate when using low concentrations, with special starches or higher concentrations of additive it is not possible to obtain sufficient accuracy or satisfactory solutions of the starch.

The present invention provides an improved apparatus which can be operated continuously and which is compact.

SUMMARY OF THE INVENTION

According to the present invention, a dosing device is provided with an outlet which opens into an in-flow hopper, the inner hopper wall of which can be flushed with water from a supply line. A fall pipe is arranged between the outlet of the in-flow hopper and a lower-lying homogenising tank.

The apparatus of the present invention requires less energy than prior art apparatus and, despite a small volume of starch milk relative to consumption, it is not at all prone to operational disturbances due to variations in the starch milk concentration. Moreover, untreated starches, special starches, starch mixtures, mixtures of starch and chemicals, pretreated starches or agglutinised starches can be used in the apparatus of the present invention. It is even possible to produce starch milk from pre-agglutinised special starches with cold water; this has hitherto only been possible with pre-heated water.

In accordance with the invention, the in-flow hopper and the fall pipe work together to supply starch reliably and continuously to the homogenising tank in which the final mixing or homogenising is carried out. Since the hopper wall can be flushed with water, a water filter is provided on the wall, which flushes the accumulating starch, and particularly the accumulating starch slurry, to the out-flow. The fall pipe is dimensioned so that a slightly low pressure can be set up at the outlet of the in-flow hopper as soon as the outlet of the hopper threatens to become blocked by lumps of starch.

A water mixing unit may be provided for introducing water into the fall pipe in dosed amounts. This water mixing unit does not have the task of homogenising or dissolving the starch-water mixture completely. The component amounts of water and starch are merely brought together here and roughly pre-mixed.

A very expedient design for the apparatus is obtained by connecting a pump in between the outlet of the homogenising tank and the consuming device. This pump, which may simultaneously be used as a dosing pump, sucks the starch milk out of the homogenising tank and forces it to the consuming device concerned. In a preferred embodiment, the pump is a positive displacement pump with adjustable rotary speed, and the homogenising tank is mounted immediately adjacent to or on the pump. Preferably, the pump should be a pump with the most even through-put possible. The starch slurry can be drawn off from the homogeniser in an excess amount by a consuming device, and the excess can be returned in a conduit to the homogeniser.

The dosing device may be a dosing screw, the intake end of which is connected to a starch storage container. Its outlet may be a pipe extending vertically downwards which opens out in the in-flow hopper. The diameter of the dosing screw is adapted to the desired dosing quantity range. Loading of the storage container may be carried out with sacked goods or from a silo plant via a supply screw. When the apparatus is connected to a silo plant the storage container may be equipped with an empty or full indicator to control the supply screw. An air filter may be built into the lid of the container. A particularly favorable supply of starch is obtained if the outlet extends vertically downwards directly into the in-flow hopper.

A preferred design of the inlet hopper is provided at its upper end with a double casing having a water permeable inner wall in which the water supply line opens. In this way, a desired film of water can be produced on the hopper wall so that the starch is prevented from being deposited on this wall.

The inner wall of the double casing may be made, for example, of sintered metal or porous plastics, ceramic or glass material. This makes a very simple construction possible. Said inner wall may, however, also consist of multi-layer strainer mesh made of corrosion and wear resistant material such as plastics or stainless steel. The height of the double casing can be reduced in this way. With this embodiment the inner face of the strainer mesh should preferably be supported in order to prevent the strainer mesh from being pressed through towards the inside.

It is preferable to have the water supply line to the inflow hopper open at a tangent to the inner wall thereof, so that a film of water is created which swirls in the hopper. At the upper end of the in-flow hopper, nozzles of nozzle-shaped pipes may also be provided for spraying the inner wall of the hopper. These nozzles may be connected to an annular conduit and may be evenly distributed at intervals around the circle. In this embodiment a double casing is not required, and the nozzles or nozzle-type pieces of pipe can be arranged vertically or they may extend obliquely outwards.

A water mixing unit is arranged downstream of the in-flow hopper in the fall pipe. It is preferably operated on the principle of a water-jet pump. With this water mixing unit a slight suction effect is obtained in the outlet of the in-flow hopper. This makes possible a better removal of the starch which is delivered in doses to the in-flow hopper.

A particularly simple construction of the water mixing unit is provided with an extension on the outlet of the in-flow hopper. The lower edge of the extension is tapered and extends into an annular chamber which is formed in the fall pipe where a water supply line opens out. The tapered lower edge of the extension forms an annular gap with a tapered annular wall on the fall pipe.

An alternative design for the water mixing unit is provided with an extension at the outlet of the in-flow hopper. This extends into an annular chamber that is formed in the fall pipe where a water supply line opens out. The extension is provided with bores which conect the annular chamber with the fall pipe. There is no gap in this embodiment. The water is introduced into the fall pipe via bores.

It is preferable that the amount of water supplied to the hopper be kept constant, while the remaining portion, which varies according to the total requirement, should be conducted away to the fall pipe. It has also been found that if a constricted through-flow guide is provided to guide the flowing medium through the agitation zone in the homogenising tank, improved homogenisation is obtained.

According to the invention, a cone which is open at both ends is arranged in the homogenising tank between the inlet and an agitator, the larger open end of this cone rests against the inner wall of the homogenising tank, and its smaller opening is located downstream of said larger open end. In this case, an agitator shaft may extend through said smaller opening and may bear the agitator downstream of this small opening, or inside it. The cone conducts the starch-water mixture which is to be homogenized directly into the agitator.

The agitator may be constructed as a propeller or bar agitator. However, toothed discs may also be used, or a blade agitator and turbine wheels. A grid agitator or wavy discs may also be used. Adequate homogenisation may also be obtained with smooth discs or cylinders, or even with the agitator shaft on its own.

In order to achieve positive guiding of the medium when there is a higher proportion of solids, a pipe extension may extend out from said smaller opening, and the agitator may be arranged downstream of this pipe extension or actually in it. In this case, the length of the pipe extension may be approximately equal to the diameter of said smaller opening.

The constricted through-flow guide can be constructed as a double cone with an intermediate pipe. The large open ends of the double cone rest against the inner wall of the homogenising tank and form the inflow and out-flow apertures of the constricted through-flow guide. The agitator may be arranged in the widening section of the cone which lies downstream, or in the intermediate pipe. Positive guiding with a high proportion of solid matter is thus made possible. A desirable rolling motion is achieved in the lower container space, and this is important when homogenising agents or solvents are added. In this embodiment as well, the intermediate pipe may be approximately as long as the diameter of the smaller cone openings.

In another embodiment, the constricted through-flow guide may also be a tubular casing which forms an annular gap with the inner wall of the homogenising tank and inside which a double cone with an intermediate pipe is arranged. The large open ends of the double cone are joined to the edges of the tubular casing. The agitator may be arranged in the intermediate pipe or in one cone. In this case as well, the length of the intermediate pipe may be approximately equal to the diameter of the smaller cone openings. Preferably, the agitator is located in the narrowest section, and an annular gap is formed with the container wall. This enables a better rolling motion to be achieved and higher rolling performance is possible. In particular, this embodiment can be used with high rolling performance for substances having high concentrations of solid matter and for media which are difficult to homogenise or dissolve.

In order to make is possible to control the apparatus of the invention, the dosing device and the pumps may each be regulated in response to conditions in a consuming device (i.e. downstream processing equipment, a storage tank, etc.)

It is preferred to arrange ball cocks in the water supply lines so that a specific dosing of the amount of water can be achieved. In order to control the dosing of water, a regulating valve controlled by the level indicator of the homogenising tank may be arranged in the water supply lines.

Starch milk concentrations of up to 30 parts of starch (percent dry substance) may be produced with this apparatus.

Special cold-swelling starches, which have to be mixed partly with warm water when used in a charge method, may be mixed or dissolved with cold water to concentrations of from about 4 to 5 parts of starch (percent dry substance). With this method, the amount of space required can be greatly reduced, since additional containers and pipelines can be omitted.

The prior art apparatus consists of a mixing-rocking container from which the prepared starch milk is pumped into a buffer container. From this buffer container the starch milk is then supplied to the consuming device. With the continuously operating apparatus according to the present invention, the mixing-rocking container is replaced by a small homogenising tank with a small agitator. The buffer container with agitation means and the pumps between the mixing-rocking container and the buffer container are also eliminated. Detailed examples of the invention will be explained in the following description, with reference to the Figures in the drawings.

BRIEF DESCRIPTION OF THE DRAWINGS

FIG. 4 is a sectional view of another embodiment of an in-flow hopper.

FIGS. 5 and 6 are schematic views of other embodiments of the in-flow hopper.

DETAILED DESCRIPTION

Figure 1:
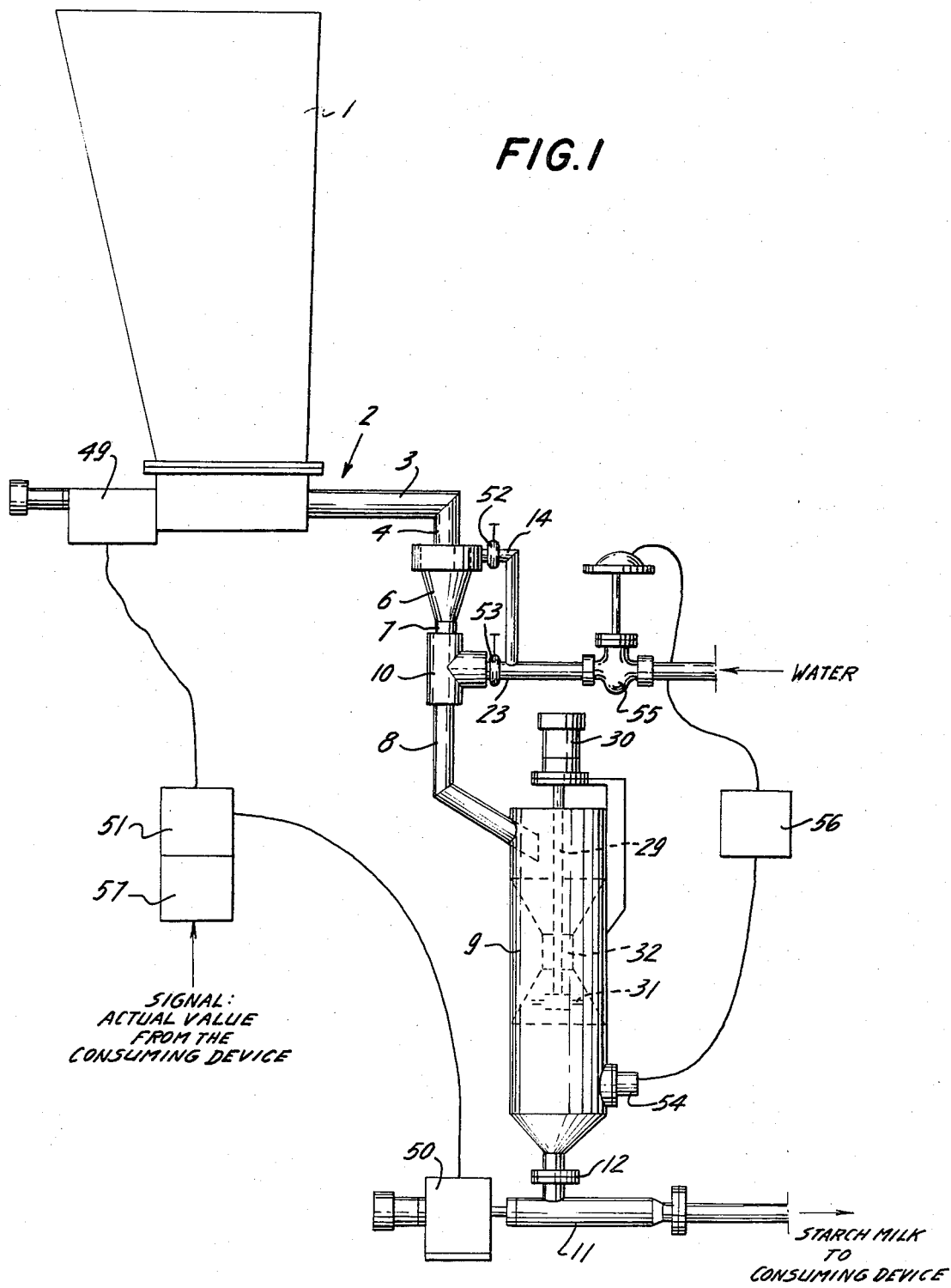
FIG. 1 is a schematic view of the apparatus of the present invention for the continuous preparation of starch milk.

FIG. 1 shows schematically the apparatus of the present invention. Storage container 1 which is for starch is connected to the intake end of a dosing device 2 which may be a supply screw 3. The delivery end 4 of the supply screw 3 extends vertically downward into an in-flow hopper 5, 6 which has a water connection line 14. A water film is produced in the in-flow hopper. Said water film conducts the starch through the outlet 7 of the in-flow hopper 5 into a fall pipe 8. A water mixing unit 10 is disposed in the fall pipe 8 and is supplied with water via a line 23. In this mixing unit the remaining amount of water, if required, can be supplied to the starch-water mixture already produced. The fall pipe 8 opens out in a homogenising tank 9 which is equipped with an agitation mechanism 29, 30, 31. The outlet 12 of the homogenising tank 9 is connected to a pump 11 which pumps the prepared starch milk to the consuming device which can be, for example, a tank or other suitable container, or a further processing system.

The drive of the dosing screw 3 can be effected via a regulating mechanism 49. Adjustment of the rotary speed can be effected manually or by means of an electrically or pneumatically operated adjustment member.

The outlet 4 of the dosing screw 3 is a pipe which is closed at the top and extends vertically downward. The connection with the adjoining part of the apparatus is effected via a plastic element which is adapted to the required shape. In this way, measurement differences in the construction of the apparatus are avoided.

Figure 2:
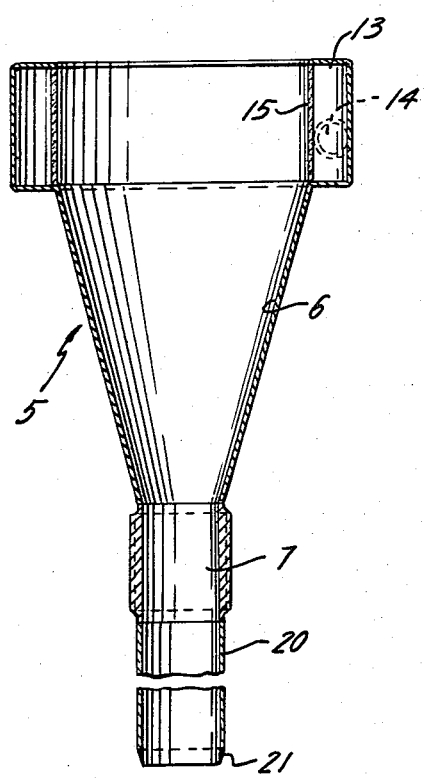
FIG. 2 is a sectional view of one embodiment of the in-flow hopper.
Figure 3:
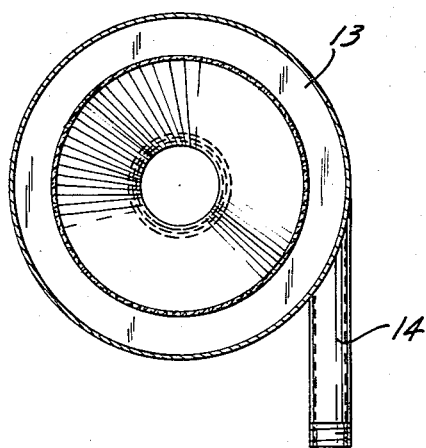
FIG. 3 is a plan view of the in-flow hopper shown in FIG. 2.

One embodiment of the in-flow hopper is shown in FIGS. 2 and 3. The upper part of the in-flow hopper 5 has a double casing 13. This double casing 13 is connected to a water supply line 14. If the inner wall 15 of this double casing is made water-permeable, the water can penetrate through this inner wall 15 and a film of water which moves downward is formed on the inner hopper wall 6. The downward movement can also be combined with a rotary or swirling movement if the entry of the water supply pipe 14 is tangential. This design prevents the deposition of starch on the hopper walls. The starch dust in particular is flushed to the outlet.

In the embodiment shown in FIGS. 2 and 3 the inner wall 15 of the double casing consists of sintered metal.

As shown in FIG. 5, the inner wall of the double casing may consist of multi-layer strainer mesh 16 made of plastic material or stainless steel. In this way, the height of the double casing can be reduced. The inner face 17 is adequately supported in order to prevent the strainer mesh from being pushed through towards the inside.

As shown in FIG. 6, the in-flow hopper 5 can also be constructed without a double casing. In this embodiment it is only necessary to arrange nozzles 18, which can be directed vertically downward, inward or outward, in the upper section of the hopper 5. These nozzles can be arranged on an annular conduit 19 and are then distributed evenly at intervals around the circle. It has been found expedient, for example, to provide from three to eight nozzles of this kind. These nozzles are then supplied from the common water connection 14.

Embodiments showing the mounting of the mixing unit 10 may be seen in FIGS. 2, 4 and 7, 8.

Figure 7:
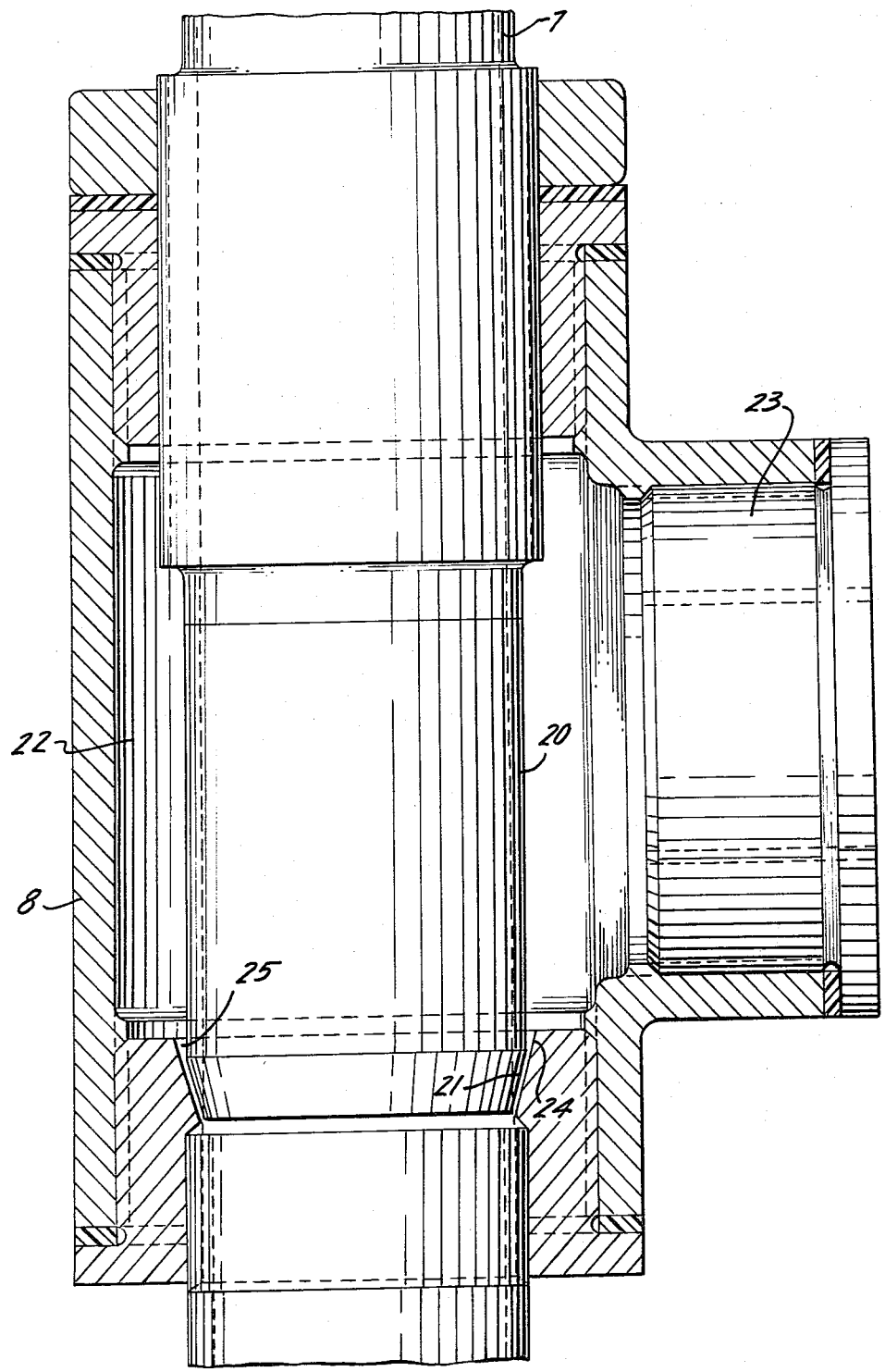
FIGS. 7 and 8 are sectional views of the water mixing unit.

As FIGS. 2 and 7 show, the in-flow hopper 5 has a tubular extension 20 at its outlet 7. This tubular extension 20 extends into the fall pipe 8 and together with this fall pipe 8 forms and annular chamber 22 which is in communication with the water supply line 23. At its lower edge 21 the extension 20 is tapered, and the fall pipe 8 has an annular wall 24 which is tapered in a corresponding manner so that an annular gap 25 is formed between them. When water is being supplied, this design produces a suction effect line that of a water jet pump.

Figure 8:
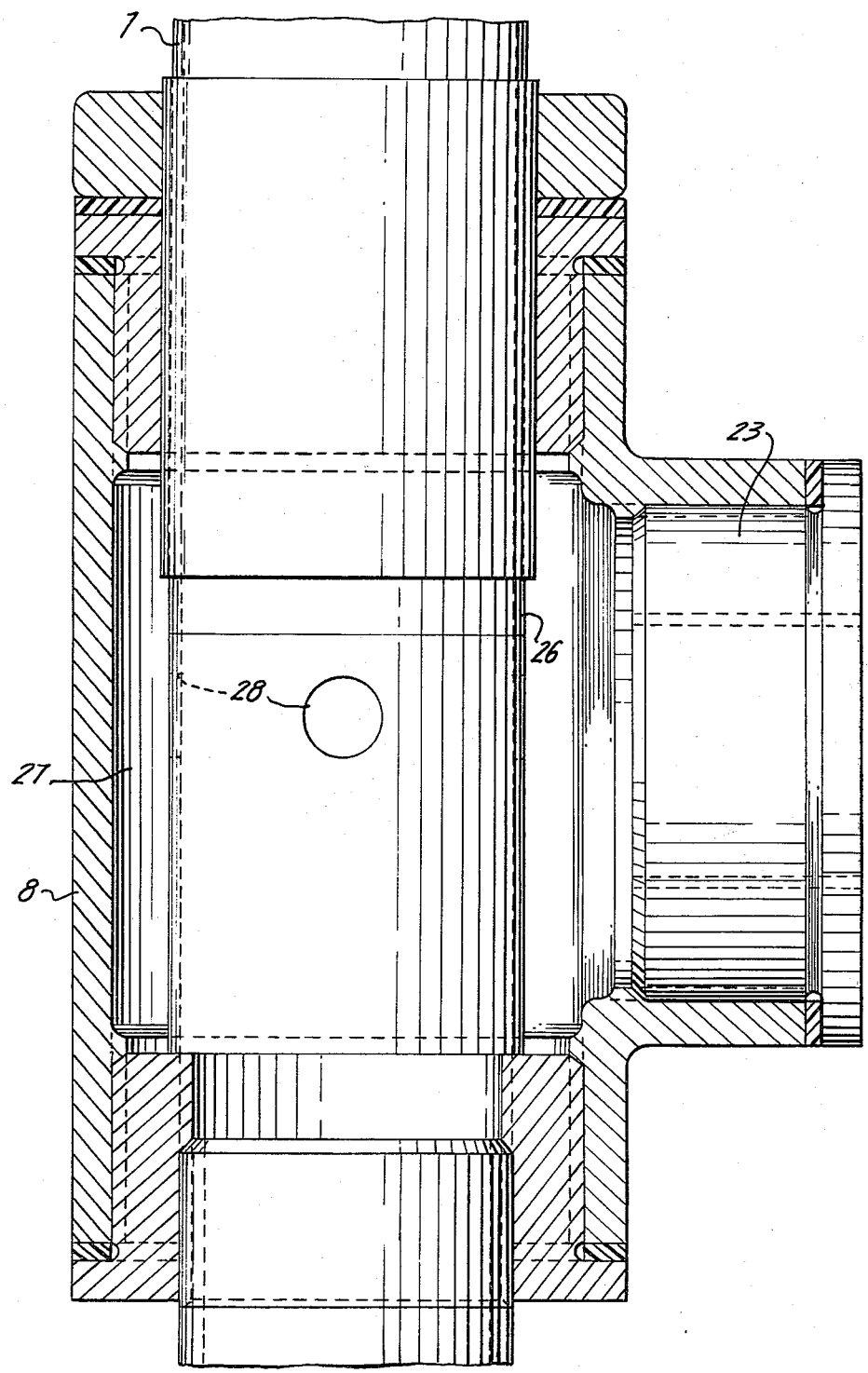

The embodiment of the water mixing unit 10 shown in FIGS. 4 and 8 has no annular gap. The extension 26 of the outlet 7 of the in-flow hopper 5 again extends into the fall pipe 8 and forms an annular chamber 27 with it, but in this case the chamber is closed at its lower end. The annular chamber 27 is in communication with the water supply line 23. Bores 28 are provided in the extension 26, and water can enter via these bores into the fall pipe 8 from the annular chamber 27.

In the fall pipe 8 a suction effect is produced from the outlet 7 of the in-flow hopper 5 up to the outlet 12 in the homogenising tank 9. The length required for the fall pipe 8 can be determined in a simple way by tests.

Although in the apparatus according to the invention a homogenising tank 9 without a constricted through-flow guide 32 may be used, it has been found advantageous to provide a constricted through-flow guide in the homogenising tank 9.

Figure 9:
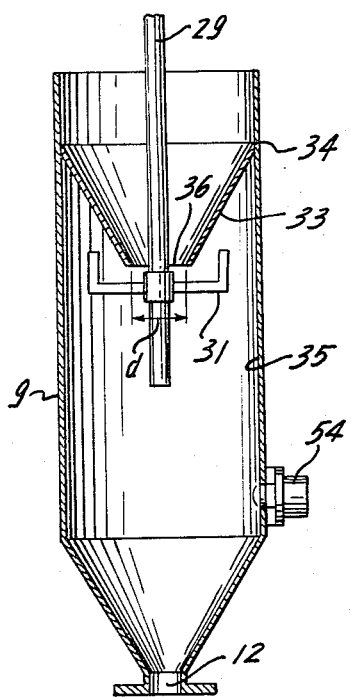
FIGS. 9 to 12 are sectional views of embodiments of the homogenising tank.

As FIG. 9 shows, this constricted through-flow guide can simply be a cone 33 tapering downward, the large open end 34 of which rests on the inner wall 35 of the homogenising tank 9. The agitator shaft 29 which is driven by an agitation mechanism 30 extends through the downstream small opening 36 in the cone, and the agitator 31 is arranged underneath this opening 36. In this way, compulsory flowing of the medium through the agitation mechanism area is achieved. The diameter d of the small opening 36 is adapted to the pump suction performance and to the speed of the stream of fluid, and makes possible a flow speed of, for example, 0.2 to 1.0 m/sec, depending on the medium.

In all the embodiments, the homogenising tank 9 has a level indicator 54.

The diameter d of the homogenising tank 9 depends in practice only on the size of the dosing screw which lies in front of it in the circuit. The diameter should not be smaller than the connection of the level indicator. This means a smallest diameter of approximately 100 mm. With substances which cannot be homogenised or dissolved so quickly, a certain period of dwell must be set, and this is sometimes necessary for smoothing out differences in the concentration.

Figure 10:
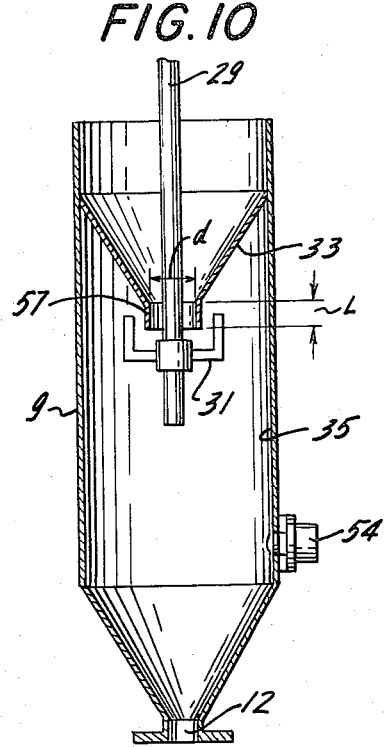

In the embodiment shown in FIG. 10, positive guiding of the medium is made possible for substances with higher proportions of solid matter. A pipe extension 57, is provided at the end of the cone 33, the length L of this pipe extension being approximately equal to the diameter d of the smaller opening 36 in the cone 33.

Figure 11:
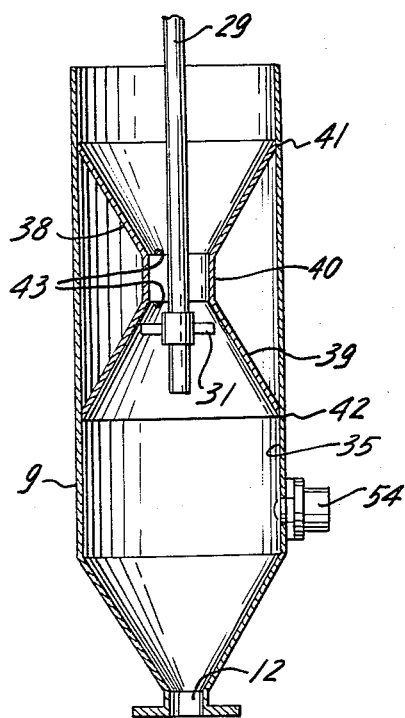

An embodiment for substances with high proportions of solid matter, with positive rolling in the lower container space, is shown in FIG. 11. A double cone 38, 39 is provided and an intermediate pipe 40 is arranged between the smaller diameter opening 43 of this double cone. The agitator 31 of the agitation mechanism is located in the widening part of the cone 39 which is disposed downstream. The edges 41, 42 of the cones 38, 39 form in-flow and out-flow openings and rest against the inner wall 35 of the homogenising tank 9. This embodiment is useful when it is necessary to enhance the homogenisation or disolving process.

Figure 12:
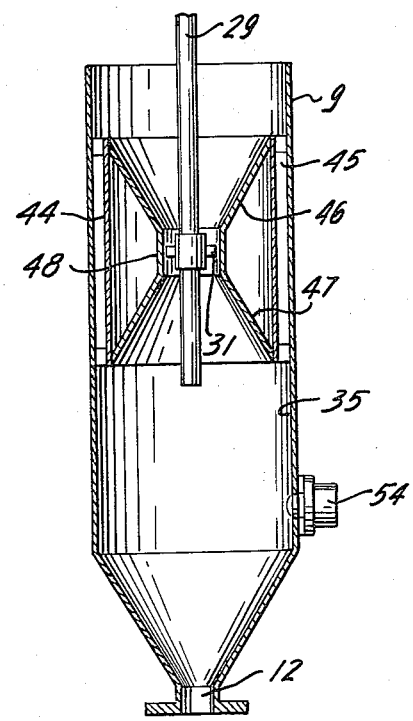

As FIG. 12 shows, the constricted through-flow guide 32 may have a tubular casing 44. This tubular casing 44, together with the inner wall 35 of the homogenising tank, forms a gap 45. Inside the tubular casing 44 a double cone 46, 47 is arranged, which again has an intermediate pipe 48. The agitator 31 is located in the narrowest section of the constricted through-flow guide. This embodiment ensures better rolling. Higher rolling performance is also possible. This is particularly useful for high solid concentrations and media which are difficult to homogenise and dissolve. The gap 45 may have a width of, for example, from approximately 5 to 10 mm.

In the embodiment shown in FIGS. 2 and 7 the water supply is divided into two streams, supplied via the lines 14 and 23. The main amount of water is supplied in this case via the line 23, while a lesser amount is supplied to the double casing 13 of the in-flow hopper 5. This is the normal case.

With higher concentrations, however, the ratio may vary, so that the water mixing unit 10 has to be supplied with less water. However, in this case the annular gap 25 in the water mixing unit 10 must also be made smaller. Furthermore, the two lines 14, 23 should then have ball cocks 52 and 53. In this way it is possible to adjust the distribution positively, since the counterpressures in the double casing 13 of the in-flow hopper 5 and in the water mixing unit 10 are different.

It is also possible to connect the supply line 14 with the ball cock 52 in the in-flow hopper 5 in the water supply line in front of the regulating valve 55 instead of after the regulating control valve 55. The regulating valve 55 can then be designed smaller. A constant stream of water then flows via the line to the double casing 13 of the in-flow hopper 5. However, for this the apparatus must be built into another plant so that when the machine is stopped it is possible to shut off the water supply via an additional valve built into the water supply line.

If required, it is possible to supply all the water to the double casing of the in-flow hopper 5 in the embodiment of the in-flow hopper 5 which has the strainer mesh 16, shown in FIG. 5. In this case, the water mixing unit 10 may be omitted. The fall pipe 8 would possibly have to be lengthened in this case. Such a modification is possible with the in-flow hopper 5 shown in FIG. 6.

The regulating valve 55 is actuated by a regulator 56 which receives an actual value signal from the level indicator which is attached to the wall of the homogenising tank 9. Although the level measurement is affected by the agitation mechanism in the homogenising tanks with the various embodiments of the constricted through-flow guide 32, it enters the measurement as a constant. The height at which the level is set depends on the kind of substance used or on the type of starch, and may lie between the upper edge of the element and the inlet into the narrowest section of the inserted component. The operating point is established by the initial adjustment of the apparatus at the operating site.

The apparatus shown and described can be operated as controlled apparatus.

A signal relating to the amount of starch to be added in doses is available from any device consuming the starch milk. This signal is based upon an actual value which is supplied in a ratio from a required value converter 57. This converter 57 supplies the corresponding required value signals to the regulator 49 for the regulating drive of the dosing screw 3 and to the regulator 51 for the regulating drive of the pump 11. Regulators do not necessarily have to be used. Simpler systems may also be adequate, since just one required value setting may be sufficient for the two drive adjustments.

If the concentration is measured in the supply line from the pump 11 to the consuming device, the regulator 49 for the regulating drive of the dosing screw 3 can be influenced. The regulator 50 for the regulating drive of the pump 11 would then be influenced primarily by the actual value from the consuming device.

With a supplementary amount of through-flow in the line from the pump 11 to the consuming device a completely controlled system can then be developed. In this case, after a specific signal ratio has been established in the required value converter, the actual value from the consuming device corresponds to the two required values for the regulator. The corresponding actual values are supplied by the concentration measuring equipment and the through-put measuring equipment. The dosing of water is dependent only on the pump setting. A constant fluid level is set up in the homogenising tank 9 via the level indicator 54, i.e. the water supply corresponds to the amount supplied by the pump at that moment. However, another embodiment can be used where operation continues for a long time at a fixed through-put value and with a constant concentration. Only when the type being used by the consuming device is changed is it necessary to re-set the dosing of starch by hand. In most cases, it is quite unnecessary to vary the pump setting as well, since the proportion of water in the starch milk plays a subordinate role in the consuming device. This means that the regulating drives for the dosing screws and the pumps may be replaced by setting mechanisms. Only the regulator for dosing the water is then required.

It would also be appropriate to effect measurement of the concentration in the line from the pump to the consuming device. In this instance, in the simplest cases alarms could be actuated after the required value had been exceeded or not attained. It would also be possible to construct the drive for the dosing screw as a regulating drive again. Deviations from the required value of the starch milk concentration could then be compensated by a regulator.

Having set forth the general nature and some specific embodiments of the present invention, the scope of the invention is now particularly set forth in the appended claims.

What is claimed is:

1. An apparatus for the continuous preparation of starch milk, which apparatus comprises:
   (1) a dosing means for supplying dry starch from a storage source through a downward outlet opening,
   (2) an homogenizing unit adapted to receive said starch, and further comprising:
      (a) an upper in-flow hopper having
         (i) an annular upper member,
         (ii) a hopper member depending from said annular upper member and disposed vertically below said outlet of said dosing means, said hopper member having a conical interior surface tapering inwardly from said annular upper member to a lower opening; and,
         (iii) a flushing means in communication with said annular upper member and adapted to provide a continuous film of water onto the interior surface of said hopper,
      (b) a fall pipe section in communication with the lower opening of said hopper member and extending generally downward, (c) a lower section disposed at the lower terminus of said fall pipe and directly in communication therewith, which lower section comprises:
  (i) a homogenizing tank, capable of holding a quantity of prepared starch milk
  (ii) an agitating means disposed within said homogenizing tank and capable of keeping stored starch milk in a state of agitation,
  (iii) means to indicate the levels of starch milk in said tank, and
  (iv) an outlet adapted to provide prepared starch milk to a consuming device.

2. The apparatus of claim 1, further comprising a water mixing means for dosed introduction of water into said fall pipe.

3. The apparatus of claim 2 wherein said water mixing unit is a water-jet pump.

4. The apparatus of claim 3, wherein the outlet of said upper in-flow hopper has an extension, the lower edge of which is tapered and extends into an annular chamber which is formed in said fall pipe provided with a water supply line, and said tapered lower edge of said extension forms an annular gap with a tapered annular wall of said fall pipe.

5. The apparatus of claim 3, wherein said outlet of said upper in-flow hopper has an extension which extends into an annular chamber which is formed in said fall pipe provided with a water supply line and said extension has bores which connect said annular chamber with said fall pipe.

6. The apparatus of claim 1, further comprising a pump which is connected between the outlet of said lower section and a consuming device.

7. The apparatus of claim 6, wherein said dosing means and said pump each have a regulating drive which is connected to a regulator which responds to an actual value from a consuming device.

8. The apparatus of claim 6, wherein said pump is a positive displacement pump with adjustable rotary speed.

9. The apparatus of claim 6 wherein said lower section is mounted immediately adjacent to or on said pump.

10. The apparatus of claim 6 wherein said dosing means is a dosing screw, the intake end of which is connected to a storage container for starch.

11. The apparatus of claim 10, wherein the outlet of said dosing screw is a pipe extending vertically downward, which opens out into said upper in-flow hopper.

12. The apparatus of claim 1, wherein the upper member of said upper in-flow hopper has a double casing, the inner wall of which is water-permeable, in which a water supply line opens out.

13. The apparatus of claim 12, wherein said inner wall is comprised of sintered metal, porous plastic, ceramic or glass.

14. The apparatus of claim 12, wherein said inner wall is comprised of a multi-layer strainer mesh made of plastic or stainless steel.

15. The apparatus of claim 14, wherein the inner face of said strainer mesh is supported.

16. The apparatus of claim 12, wherein said water supply line opens out at a tangent to the inner wall of said upper in-flow hopper.

17. The apparatus of claim 12, wherein the upper end of said upper in-flow hopper is provided with nozzle means connected to said water supply line.

18. The apparatus of claim 17, wherein said nozzle means are connected to an annular conduit and are evenly distributed at intervals around said upper end of said upper in-flow hopper.

19. The apparatus of claim 1 wherein a constricted through-flow guide is provided around said agitating means.

20. The apparatus of claim 19, wherein said constricted through-flow guide is comprised of a double cone provided with an intermediate pipe, the greater diameter edges of said double cone resting against the inner wall of said homogenising tank and form the in-flow and out-flow opening of said constricted through-flow guide.

21. The apparatus of claim 19, wherein said constricted through-flow guide is provided with a tubular casing which forms an annular gap with the inner wall of said homogenising tank and inside of which there is a double cone with an intermediate pipe, the greater diameter edges of said double cone being joined to the edges of the tubular casing.

* * * * *